United States Patent
Tong et al.

(10) Patent No.: US 12,343,870 B1
(45) Date of Patent: Jul. 1, 2025

(54) SELF-ADAPTIVE IDENTIFICATION METHOD FOR NONLINEAR DYNAMIC PARAMETERS OF REDUCER

(71) Applicant: Zhejiang University, Hangzhou (CN)

(72) Inventors: Zheming Tong, Hangzhou (CN); Zhenxi Li, Hangzhou (CN)

(73) Assignee: Zhejiang University, Hangzhou (CN)

( * ) Notice: Subject to any disclaimer, the term of this patent is extended or adjusted under 35 U.S.C. 154(b) by 0 days.

(21) Appl. No.: 19/049,379

(22) Filed: Feb. 10, 2025

(30) Foreign Application Priority Data

Jul. 3, 2024 (CN) .......................... 202410885767.0

(51) Int. Cl.
*B25J 9/16* (2006.01)
(52) U.S. Cl.
CPC .................................. *B25J 9/1605* (2013.01)
(58) Field of Classification Search
CPC ..... B25J 9/1605; B25J 9/00; B25J 9/16; B25J 9/1607; B25J 9/161; B25J 9/1633; B25J 9/1638; B25J 9/1641; B25J 9/1653; B25J 9/1664; B25J 9/1671; B25J 9/1692; B25J 9/1635; G05B 2219/39186; G05B 2219/40279
See application file for complete search history.

(56) References Cited

FOREIGN PATENT DOCUMENTS

| CN | 104723340 A | * | 6/2015 |
| CN | 109583093 A | | 4/2019 |
| CN | 16619365 A | | 8/2023 |

OTHER PUBLICATIONS

Trumić, "Force/Torque-Sensorless Joint Stiffness Estimation in Articulated Soft Robots," Jul. 2022 (Year: 2022).*
Swevers, "Optimal Robot Excitation and Identification," Oct. 1997 (Year: 1997).*

* cited by examiner

*Primary Examiner* — Adam R Mott
*Assistant Examiner* — Byron Xavier Kasper
(74) *Attorney, Agent, or Firm* — WCF IP

(57) ABSTRACT

Provided is a self-adaptive identification method for nonlinear dynamic parameters of a reducer, which belongs to the design field of a reducer. The method includes: modeling a harmonic reducer corresponding to a flexible joint as a concatemer of a rigid reducer and an elastic torsion spring, and carrying out dynamic theoretical modeling and parameter variable independence processing on the concatemer to form a dynamic equation for parameter identification; giving an optimized motion trajectory to each joint of a robot and controlling the robot to act accordingly, acquiring relevant data needed for parameter identification based on a built-in torque sensor and double encoders inside the joint; using an offline identification algorithm to accurately identify a plurality of dynamic parameters of a collaborative robot considering joint flexibility and friction, and obtaining a minimum parameter set.

5 Claims, 7 Drawing Sheets

SELF-ADAPTIVE IDENTIFICATION METHOD FOR NONLINEAR DYNAMIC PARAMETERS OF REDUCER

CROSS-REFERENCE TO RELATED PRESENT DISCLOSURE

This patent application claims the benefit and priority of Chinese Patent Application No. 202410885767.0 filed with the China National Intellectual Property Administration on Jul. 3, 2024, the disclosure of which is incorporated by reference herein in its entirety as part of the application.

TECHNICAL FIELD

The present disclosure belongs to the design field of a reducer, and in particular, relates to a self-adaptive identification method for nonlinear dynamic parameters of a reducer.

BACKGROUND

A collaborative robot is a new intelligent robot system. Compared with conventional industrial robots, collaborative robots are more flexible, intelligent and safe. With the continuous development of manufacturing and service industries, collaborative robots that can be interacted with human beings safely and can be adapted to complex working conditions are more and more widely used. How to further improve the motion control accuracy; the intelligence, the operation stability and the service life of collaborative robots and improve the industrial production efficiency/service quality has become an urgent problem.

The first collaborative robot UR5 in the world was delivered in 2008. Up to now; most collaborative robots in the world still use UR5 configuration, and use a plurality of integrated joints and connecting rods to form a reconfigurable robot system. The integrated joint of the robot usually consists of a servo motor, a harmonic reducer, various sensors, a brake and so on. Because of the characteristics of harmonic transmission of a reducer, the joint of the robot is flexible, so that a collaborative robot also belongs to a flexible joint robot. The joint flexibility brings difficulties to the position control of the end of the robot, but also brings new opportunities to joint torque sensing and dynamic control. Nowadays, many first-class robot companies in the world are developing high-performance collaborative robots with joint torque sensors. In addition to independent torque sensors built in directly, AUBO proposes a method of directly integrating torque, vibration and temperature sensors into the harmonic reducer, forming an intelligent harmonic reducer with multi-sensing functions and gradually realizing industrialization.

At present, the dynamic parameter identification methods widely used in the field of collaborative robots include a disintegration measurement method, a Computer Aided Design (CAD) method and an overall identification method. The disintegration measurement method decomposes the robot connecting rod, measures the geometric parameters and determines the material properties to calculate the inertia parameters, so as to obtain the dynamic parameters and model of the robot. It is difficult to implement this method for components with complex shapes. Moreover, this method cannot consider the joint friction and flexibility of the robot in the actual operation process. The CAD method is to directly calculate the dynamic parameters of the three-dimensional model of the robot by the CAD software, but has disadvantages that the CAD model is the inertial parameter value in an ideal situation, the actual value will include machining and assembly errors, and the influence of the joint friction and flexibility on the dynamic of the robot in the actual operation process cannot be considered. The overall identification method is to carry out an experiment on the actual robot, which is one of the most commonly used and practical methods for dynamic parameter identification. In this method, an optimized motion trajectory is usually given to the robot, the torque and the rotation angle of each joint are measured, the measured data are brought into the identification model, and the dynamic parameter values are calculated through the identification algorithm. The current and the rotation angle of the motor are measured by the existing overall identification scheme. The rotation angle is measured by the encoder, and the speed and the acceleration of the joint are calculated by a difference method. The torque value is obtained by multiplying the current value of the motor current sensor by the current-torque constant. However, the joint angular acceleration calculated from the joint rotation angle by the second difference amplifies the system noise, so that the accuracy decreases. The introduction of a filter will result in input delay and reduce the system response speed. The method of estimating the joint torque by the current of the motor will also result in noise in the estimated torque value due to the influence of the friction of the reducer. When there are errors in the joint acceleration and the joint torque, the parameter identification will decrease the identification accuracy, and the parameters are easily influenced by load changes.

The existing robot dynamic parameter identification is usually aimed at a rigid joint dynamic model, in which the expression is $M(q)\ddot{q}+C(\dot{q},q)\dot{q}+g(q)=\tau+\tau_{ext}$, where $M(q)$ denotes an inertia matrix. $C(4,4)$ denotes a coupling matrix of a Coriolis force and a centrifugal force. 8 (q) denotes a gravity matrix. $\tau$ denotes a joint torque, and $\tau_{ext}$ denotes an external contact torque. The joint stiffness coefficient and friction coefficient are not involved in this model. However, because the collaborative robot uses a harmonic reducer for transmission, and some high-performance robots also have built-in joint torque sensors with elastic elements, the joint has obvious flexibility characteristics. If the flexibility characteristics of the joint are ignored in the modeling process of robot dynamic, the modeling accuracy will be reduced.

Therefore, for the intelligent harmonic reducer in the collaborative robot, how to carry out modeling considering joint flexibility and friction, and carry out offline identification and online updating of the dynamic parameters is an urgent technical problem.

SUMMARY

The purpose of the present disclosure is to solve the problem in the prior art that the flexibility characteristics of the joint are ignored in the modeling process of robot dynamic so that it is difficult to realize accurate robot dynamic modeling and parameter identification, and to provide a self-adaptive identification method for nonlinear dynamic parameters of a reducer.

The specific technical scheme used by the present disclosure is as follows.

A self-adaptive identification method for nonlinear dynamic parameters of a reducer, which is used for parameter identification of each flexible joint in a collaborative robot, wherein the method includes:

S1, modeling each flexible joint in the collaborative robot, which comprises modeling a harmonic reducer corresponding to a flexible joint as a concatemer of a rigid reducer and an elastic torsion spring, connecting the rigid reducer with a driving motor corresponding to the flexible joint directly; and connecting the elastic torsion spring with a connecting rod corresponding to the flexible joint directly; and carrying out linear separation and parameter independence processing on a flexible joint dynamic model obtained by modeling to finally obtain a dynamic equation for parameter identification, wherein in the dynamic equation, a linear regression matrix is multiplied by a minimum parameter set of identified parameters to obtain a joint torque actually output by the flexible joint;

S2, designing a motion trajectory curve of each flexible joint to be identified in the collaborative robot in a form of Fourier series; wherein the motion trajectory curve consists of a time domain expression of the rotation angle of the connecting rod, a time domain expression of the angular velocity of the connecting rod and a time domain expression of the angular acceleration of the connecting rod;

S3, controlling each flexible joint in the collaborative robot to move according to the designed motion trajectory curve, acquiring encoder position signals at a motor end and an output end of the harmonic reducer through double encoders during a movement, filtering the encoder position signals to obtain time domain signals of a rotation angle of the driving motor and the rotation angle of the connecting rod, and measuring the joint torque actually output by the flexible joint through a torque sensor built in the flexible joint; dividing the rotation angle of the motor by a reduction ratio of the harmonic reducer to obtain the theoretical output rotation angle of the rigid reducer, and further obtaining the angular velocity of the rigid reducer and the angular acceleration of the rigid reducer through differential operation and filtering; changing the rotation angle of the connecting rod from a time domain signal to a frequency domain signal through discrete Fourier transform, filtering the frequency domain signal to take a main frequency and then performing inverse discrete Fourier transform to obtain the time domain expression of the rotation angle of the connecting rod, substituting the time domain expression of the rotation angle of the connecting rod into the time domain expression of the angular velocity of the connecting rod and the time domain expression of the angular acceleration of the connecting rod in the motion trajectory curve, and calculating the angular velocity of the connecting rod and the angular acceleration of the connecting rod through an analytical method;

S4, taking the theoretical output rotation angle of the rigid reducer, the angular velocity of the rigid reducer, the angular acceleration of the rigid reducer, the rotation angle of the connecting rod, the angular velocity of the connecting rod, and the angular acceleration of the connecting rod as six state variables, obtaining a regression matrix by Newton-Euler recursive dynamic equation, then obtaining linearly independent columns from the regression matrix through matrix decomposition and forming the linear regression matrix, substituting the linear regression matrix and the joint torque actually output by the flexible joint into the dynamic equation, and carrying out calculation by a least square method to obtain the minimum parameter set corresponding to the identified parameters to complete offline identification.

Preferably, in S1, the flexible joint dynamic model consists of a dynamic relation expression from the driving motor to the elastic torsion spring, a dynamic relation expression from the elastic torsion spring to the connecting rod and a friction force calculation model.

Preferably, in the dynamic equation, the identified parameter includes a parameter group corresponding to each flexible joint in the collaborative robot, and the parameter group corresponding to each flexible joint includes 14 parameters, that is, three mass moments of inertia of the connecting rod around x, y and z axes, three inertia products of the connecting rod in xy, xz and yz planes, three mass moments of the connecting rod in x, y and z directions, the mass of the connecting rod, the viscous friction coefficient, the Coulomb friction coefficient, the equivalent stiffness, and the equivalent damping.

Further, the equivalent stiffness is determined by a look-up table method, and remaining 12 parameters except the equivalent stiffness and the equivalent damping among the identified parameters are calculated by the least square method, and the equivalent damping is calculated and obtained by substituting parameters obtained by the least square method and known parameters in data acquisition process into the flexible joint dynamic model.

Further, remaining 13 parameters except the equivalent damping among the identified parameters are calculated by the least square method, and the equivalent damping is calculated and obtained by substituting parameters obtained by the least square method and known parameters in the data acquisition process into the flexible joint dynamic model.

Preferably, in the motion trajectory curve, the time domain expression of the rotation angle of the connecting rod, the time domain expression of the angular velocity of the connecting rod, and the time domain expression of the angular acceleration of the connecting rod corresponding to any i-th flexible joint are respectively:

$$q_i(t) = \sum_{l=1}^{N_i}\left[\frac{a_l^i}{\omega_f l}\sin(\omega_f l t) - \frac{b_l^i}{\omega_f l}\cos(\omega_f l t) + q_{i0}\right]$$

$$\dot{q}_i(t) = \sum_{l=1}^{N_i}\left[a_l^i\cos(\omega_f l t) + b_l^i\sin(\omega_f l t)\right]$$

$$\ddot{q}_i(t) = \sum_{l=1}^{N_i}\left[-a_l^i\omega_f l\sin(\omega_f l t) + b_l^i\omega_f l\cos(\omega_f l t)\right];$$

where $N_i$ denotes an order of Fourier series, $q_i(t)$, $\dot{q}_i(t)$ and $\ddot{q}_i(t)$ denote the rotation angle q of the connecting rod, the angular velocity $\dot{q}$ of the connecting rod, and the angular acceleration $\ddot{q}$ of the connecting rod corresponding to the i-th flexible joint at time t, respectively; $q_{i0}$ denotes a constant of a joint rotation angle, $a_l^i$ and $b_l^i$ denote constant coefficients of a motion trajectory, $\omega_f$ denotes a fundamental frequency of the motion trajectory, and $\psi_f l$ denotes a frequency of a l-th order.

Preferably, the order $N_i$ of Fourier series in the motion trajectory curve is 5.

Preferably, the matrix decomposition uses singular value decomposition or orthogonal triangular decomposition.

Preferably, the collaborative robot is a six-axis collaborative robot, and includes six flexible joints in total.

Preferably, the minimum parameter set obtained by offline identification in S4 is substituted into the dynamic equation as an initial value, a robot controller controls the robot in a actual operation process based on the dynamic equation, and continues to acquire the rotation angle of the motor, the rotation angle of the connecting rod and the joint torque actually output by the flexible joint online in each time step through the double encoders and the torque sensor built in the flexible joint in the actual operation process, the six state variables and the linear regression matrix are calculated in each time step according to a same method as offline identification, and the minimum parameter set of the dynamic equation in a next time step of the robot controller is updated online by running a recursive least square algorithm with a forgetting factor.

Compared with the prior art, the present disclosure has the following beneficial effects.

In the present disclosure, a rigid-flexible coupling dynamic theoretical model considering the joint flexibility and friction of a collaborative robot is established, and dynamic data is acquired accurately based on a joint torque sensor and double encoders of the intelligent harmonic reducer of the robot. A self-adaptive identification method for nonlinear dynamic parameters of a reducer is proposed with reference to a Fourier series optimized trajectory, a least square method and a recursive least square method. The method according to the present disclosure can be used for offline identification and online update of the dynamic parameters of the collaborative robot considering the joint flexibility and friction, so that the dynamic parameters can be more consistent with the actual situation of the robot, the dynamic modeling accuracy is improved, and the control effect of the collaborative robot is further optimized. In this way, the robot has higher adaptability to the complex working conditions such as variable loads, human-robot interaction and the like.

DETAILED DESCRIPTION OF THE EMBODIMENTS

Figure 1:
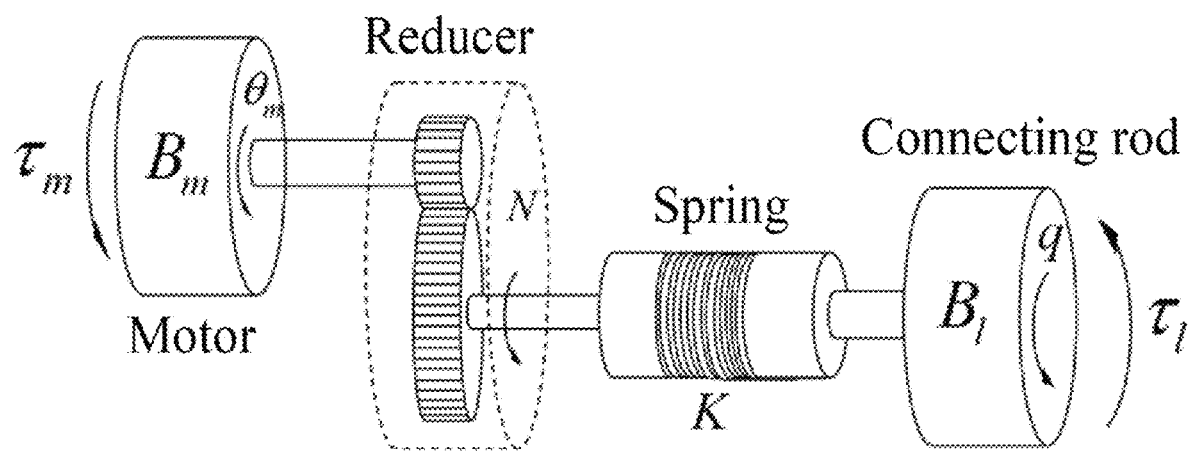
FIG. 1 is a schematic diagram of transmission of a robot considering joint flexibility.

In order to make the above objects, features and advantages of the present disclosure more obvious and understandable, the specific embodiments of the present disclosure will be described in detail with reference to the accompanying drawings hereinafter. In the following description, numerous specific details are set forth in order to provide a thorough understanding of the present disclosure. However, the present disclosure can be implemented in many other ways different from those described here. Those skilled in the art can make similar improvements without departing from the connotation of the present disclosure. Therefore, the present disclosure is not limited by the specific embodiments disclosed hereinafter. The technical features in each embodiment of the present disclosure can be combined accordingly without conflicting with each other.

In the description of the present disclosure, it should be understood that when an element is considered to be "connected" to another element, the element may be directly connected to another element or indirectly connected to another element, that is, there is an intervening element. Conversely, when an element is said to be "directly" connected to another element, there are no intervening element.

In the description of the present disclosure, it should be understood that the terms "first" and "second" are only used for distinguishing description purposes, and cannot be understood as indicating or implying relative importance or implicitly indicating the number of indicated technical features. Therefore, the features defined as "first" and "second" can explicitly or implicitly include at least one of these features.

In the present disclosure, according to the analysis of the flexible joints in the collaborative robot, the flexible link in a joint is regarded as a rigid-flexible coupling system similar to mass-spring-damping. A harmonic reducer corresponding to a flexible joint is modeled as a concatemer of a rigid reducer and an elastic torsion spring, and dynamic theoretical modeling and parameter variable independence processing are carried out on the concatemer to form a dynamic equation for parameter identification. Thereafter, an optimized motion trajectory is given to each joint of the robot, and each joint of the robot is controlled to act accordingly. Relevant data needed for parameter identification is acquired based on a built-in torque sensor of the intelligent harmonic reducer and double encoders inside the joint of the collaborative robot. An offline identification algorithm is then used to accurately identify a plurality of dynamic parameters of the collaborative robot considering joint flexibility and friction, and the initial data of the parameters is formed. In addition, in the actual operation process of the robot, the method can also acquire signals such as the torques, the angles and the angular velocities in real time, and use a recursive least square method to realize the online updating of the robot dynamic parameters to be matched with the working conditions.

In a preferred embodiment of the present disclosure, self-adaptive identification method for nonlinear dynamic parameters of a reducer is provided, which is used for parameter identification of each flexible joint in a collaborative robot. The specific steps include S1 to S4. The specific implementation process of each step is described in detail hereinafter.

In S1, each flexible joint in the collaborative robot is modeled. Herein, a harmonic reducer corresponding to a flexible joint is modeled as a concatemer of a rigid reducer and an elastic torsion spring, the rigid reducer is connected with a driving motor corresponding to the flexible joint directly, and the elastic torsion spring is connected with a connecting rod corresponding to the flexible joint directly. Linear separation and parameter independence processing are carried out on a flexible joint dynamic model obtained by modeling to finally obtain a dynamic equation for parameter identification. In the above dynamic equation, a linear regression matrix $Y_r$ is multiplied by a minimum parameter set of identified parameters P to obtain a joint torque $\tau$ actually output by the flexible joint.

In the embodiment of the present disclosure, the flexible joint dynamic model consists of a dynamic relation expression from the driving motor to the elastic torsion spring, a dynamic relation expression from the elastic torsion spring to the connecting rod and a friction force calculation model. The dynamic relation expression from the driving motor to the elastic torsion spring is defined as: an output torque $\tau_m$ of the driving motor minus a friction torque $\tau_f$ between the motor and the reducer is equal to a moment of inertia at the joint end+a stiffness torque of the elastic torsion spring+a damping torque of the elastic torsion spring. The dynamic relation expression from the elastic torsion spring to the connecting rod is defined as: a dynamic inertia term of the connecting rod+a coupling term of a Coriolis force and a centrifugal force+a gravity term is equal to the stiffness torque of the elastic torsion spring+the damping torque of the elastic torsion spring+a component of external disturbance torque at the flexible joint. The friction force calculation model is defined as: the friction torque $\tau_f$ between the motor and the reducer is equal to a Coulomb friction torque+a viscous friction torque. The specific forms of the three formulas in the flexible joint dynamic model are as follows:

$$B\ddot{\theta} + \tau + DK^{-1}\dot{\tau} = B\ddot{\theta} + K(\theta - q) + D(\dot{\theta} - \dot{q}) = \tau_m - \tau_f \quad (1)$$

$$M(q)\ddot{q} + C(q,\dot{q})\dot{q} + g(q) = \tau + DK^{-1}\dot{\tau} + \tau_{ext} = K(\theta - q) + D(\dot{\theta} - \dot{q}) + \tau_{ext} \quad (2)$$

$$\tau_f = [fv, fc]\begin{bmatrix} \dot{q} \\ \text{sgn}(\dot{q}) \end{bmatrix} \quad (3)$$

where K denotes equivalent stiffness, D denotes equivalent damping, B denotes mass of the torsion spring, $\theta$ denotes a theoretical output rotation angle of the rigid reducer, $\dot{\theta}$ denotes an angular velocity of the rigid reducer, $\ddot{\theta}$ denotes an angular acceleration of the rigid reducer, q denotes a rotation angle of the connecting rod, $\dot{q}$ denotes an angular velocity of the connecting rod, $\ddot{q}$ denotes an angular acceleration of the connecting rod, $\tau$ denotes an actual joint torque output by the flexible joint, $\dot{\tau}$ denotes a first-order derivative of $\tau$, $\tau_m$ denotes torque of the flexible joint input by the driving motor, M(q) denotes an inertia matrix of the connecting rod, $C(q,\dot{q})$ denotes a coupling matrix of the Coriolis force and the centrifugal force, g(q) denotes a gravity matrix, denotes external disturbance torque, $f_v, f_c$ denote a viscous friction coefficient and a Coulomb friction coefficient, respectively, and sgn( ) denotes an sgn function.

In the embodiment of the present disclosure, a form of the dynamic equation obtained by linear separation and parameter independence processing is $\tau = Y_r(q,\dot{q},\ddot{q},\theta,\dot{\theta},\ddot{\theta})P_r$, $Y_r(q,\dot{q},\ddot{q},\theta,\dot{\theta},\ddot{\theta})$ indicates that the linear regression matrix $Y_r$ is determined by six state variables $q,\dot{q},\ddot{q},\theta,\dot{\theta},\ddot{\theta}$. However, it should be noted that in Step S1, only an expression of the dynamic equation is constructed, and the specific values of the parameters in the model need to be calculated in the subsequent data acquisition and parameter identification process.

In the embodiment of the present disclosure, the identified parameters P in the dynamic equation includes a parameter group corresponding to each flexible joint in the collaborative robot. The parameter group corresponding to each flexible joint includes 14 parameters, that is, three moments of inertia of the connecting rod around the x, y and z axes, three inertia products of the connecting rod in the xy, xz and yz planes, three mass moments of the connecting rod in the x, y and z directions, the mass of the connecting rod, the viscous friction coefficient, the Coulomb friction coefficient, the equivalent stiffness K, and the equivalent damping D. Different collaborative robots have different numbers of the flexible joints to be identified, and each flexible joint to be identified has a corresponding parameter group in the identified parameters P. In the embodiment of the present disclosure, the collaborative robot is a six-axis collaborative robot, and includes six flexible joints in total. Therefore, the identified parameters P includes six parameter groups.

It should be noted that the equivalent stiffness among 14 parameters of the identified parameters P can be determined by a look-up table method or calculated by the least square method. Moreover, the two methods of determining the equivalent stiffness K can also be used at the same time, and the obtained results can also confirm each other.

If the equivalent stiffness K is determined by the look-up table method, the remaining 12 parameters except the equivalent stiffness K and the equivalent damping D among the identified parameters are calculated by the least square method in Step S4, and the equivalent damping D is calculated and obtained by substituting the parameters obtained by the least square method and the known parameters in the data acquisition process into the flexible joint dynamic model. Specifically, after the friction parameters $f_v$, $f_c$ are obtained through identification, the friction torque $\tau_f$ can be obtained. With reference to the joint stiffness K and the known mass of the torsion spring B obtained through identification, the output torque $\tau_m$ of the motor, the output rotation angle $\theta$ of the rigid reducer and the rotation angle q of the connecting rod are acquired, and the damping coefficient D can be calculated and obtained by the Formula (1) in the flexible joint dynamic model.

If the equivalent stiffness K is calculated by the least square method, the remaining 13 parameters except the equivalent damping among the identified parameters are calculated by the least square method in Step S4, and the equivalent damping is calculated and obtained by substituting the parameters obtained by the least square method and the known parameters in the data acquisition process into the flexible joint dynamic model. The calculating method of equivalent damping D is the same as the look-up table method, which is not described in detail here.

In S2, a motion trajectory curve of each flexible joint to be identified in the collaborative robot is designed in the form of Fourier series; wherein the motion trajectory curve consists of a time domain expression of the rotation angle q of the connecting rod, a time domain expression of the angular velocity $\dot{q}$ of the connecting rod and a time domain expression of the angular acceleration $\ddot{q}$ of the connecting rod.

In the embodiment of the present disclosure, in the motion trajectory curve, the time domain expression of the rotation angle q of the connecting rod, the time domain expression of the angular velocity $\dot{q}$ of the connecting rod, and the time domain expression of the angular acceleration $\ddot{q}$ of the connecting rod corresponding to any i-th flexible joint are respectively:

$$q_i(t) = \sum_{l=1}^{N_i}\left[\frac{a_l^i}{\omega_f l}\sin(\omega_f l t) - \frac{b_l^i}{\omega_f l}\cos(\omega_f l t) + q_{i0}\right]$$

-continued $$\dot{q}_i(t) = \sum_{l=1}^{N_i} \left[ a_l^i \cos(\omega_f l t) + b_l^i \sin(\omega_f l t) \right]$$

$$\ddot{q}_i(t) = \sum_{l=1}^{N_i} \left[ -a_l^i \omega_f l \sin(\omega_f l t) + b_l^i \omega_f l \cos(\omega_f l t) \right]$$

where $N_i$ denotes an order of Fourier series, $q_i(t)$, $\dot{q}_i(t)$ and $\ddot{q}_i(t)$ denote the rotation angle of the connecting rod q, the angular velocity of the connecting rod $\dot{q}$, and the angular acceleration of the connecting rod $\ddot{q}$ corresponding to the i-th flexible joint at time t, respectively; $q_{i0}$ denotes a constant of a joint rotation angle, $a_l^i$ and $b_{l_i}$ denote constant coefficients of the motion trajectory, denotes a fundamental frequency of the motion trajectory, and $\omega_f l$ denotes a frequency of an l-th order.

The six-axis collaborative robot in the embodiment of the present disclosure includes six flexible joints. Therefore, the order $N_i$ of Fourier series is 5, which can meet the corresponding calculating requirements.

In S3, each flexible joint in the collaborative robot is controlled to move according to the designed motion trajectory curve, encoder position signals at a motor end and an output end of the harmonic reducer are acquired through double encoders during the movement, the encoder position signals are filtered to obtain time domain signals of a rotation angle $\theta_m$ of the motor and the rotation angle q of the connecting rod, and the joint torque $\tau$ actually output by the flexible joint is measured through a torque sensor built in the flexible joint; the rotation angle $\theta_m$ of the motor is divided by a reduction ratio N of the reducer to obtain the theoretical output rotation angle $\theta$ of the rigid reducer, and the angular velocity $\dot{\theta}$ of the rigid reducer and the angular acceleration $\ddot{\theta}$ of the rigid reducer are further obtained through differential operation and filtering; the rotation angle q of the connecting rod is changed from a time domain signal to a frequency domain signal through the discrete Fourier transform, the frequency domain signal is filtered to take a main frequency, and then the inverse discrete Fourier transform is performed to obtain the time domain expression of the rotation angle q of the connecting rod, the time domain expression of the rotation angle of the connecting rod is substituted into the time domain expression of the angular velocity $\dot{q}$ of the connecting rod and the time domain expression of the angular acceleration $\ddot{q}$ of the connecting rod in the motion trajectory curve, and the angular velocity $\dot{q}$ of the connecting rod and the angular acceleration $\ddot{q}$ of the connecting rod are calculated through an analytical method.

In S4, the theoretical output rotation angle $\theta$ of the rigid reducer, the angular velocity $\dot{\theta}$ of the rigid reducer, the angular acceleration $\ddot{\theta}$ of the rigid reducer, the rotation angle q of the connecting rod, the angular velocity $\dot{q}$ of the connecting rod, and the angular acceleration $\ddot{q}$ of the connecting rod are taken as six state variables, a regression matrix Y is obtained by Newton-Euler recursive dynamic equation, then linearly independent columns are obtained from the regression matrix Y through matrix decomposition, the linear regression matrix $Y_r$ is formed, the linear regression matrix $Y_r$ and the joint torque $\tau$ actually output by the flexible joint are substituted into the dynamic equation, and calculation is carried out by the least square method to obtain the minimum parameter set corresponding to the identified parameters to complete offline identification.

It should be noted that when calculating the minimum parameter set corresponding to the identified parameters here, if the equivalent stiffness K and the equivalent damping D have been determined in advance by the look-up table method, the fixed values can be directly used without being used as the parameters to be calculated.

In the embodiment of the present disclosure, the above matrix decomposition is realized by singular value (SVD) decomposition or orthogonal triangular (QR) decomposition and so on.

In addition, Step S1 to Step S4 are essentially a process of acquiring dynamic data by executing the motion trajectory and carrying out parameter identification offline. However, in the actual operation process of the robot, the dynamic response may also change with the change of the external environment and the wear of the robot joints themselves. Therefore, the dynamic parameters can be updated online in addition to the offline identification. The online updating process of the dynamic parameters are as follows.

The minimum parameter set obtained by offline identification in S4 is substituted into the dynamic equation as an initial value. The robot controller controls the robot in the actual operation process based on the dynamic equation, and continues to acquire the rotation angle $\theta_m$ of the motor, the rotation angle q of the connecting rod and the joint torque $\tau$ actually output by the flexible joint online in each time step through the double encoders and the torque sensor built in the flexible joint in the actual operation process, the six state variables and the linear regression matrix $Y_r$ are calculated in each time step according to the same method as offline identification, and the minimum parameter set of the dynamic equation in the next time step of the robot controller is updated online in a recursive manner by running a recursive least square algorithm with a forgetting factor.

The specific implementation process and the technical effect of the self-adaptive identification method for nonlinear dynamic parameters s of the reducer are shown hereinafter through a specific embodiment.

EMBODIMENT

In this embodiment, for a six-axis collaborative robot, the specific implementation process of dynamic modeling, equation construction, data acquisition, offline identification and online updating and the final technical effect in the self-adaptive identification method for nonlinear dynamic parameters s of the reducer described in Step S1 to Step S4 are specifically illustrated through Step 1 to Step 8.

Step 1: robot dynamic theoretical modeling considering joint flexibility is carried out.

As shown in FIG. 1, the principle of robot transmission considering joint flexibility is illustrated. The harmonic reducer is regarded as a concatemer of a pure rigid reducer and an elastic torsion spring. Moreover, all flexible links behind the reducer (including a torque sensor and a bearing) are regarded as a part of the elastic torsion spring, and the equivalent stiffness is K. In the concatemer, the rigid reducer is directly connected with the driving motor corresponding to the flexible joint, and the elastic torsion spring is directly connected with the connecting rod corresponding to the flexible joint. The torque of the driving motor inputting to the joint is $\tau_m$, the rotation angle of the driving motor is $\theta_m$, the reduction ratio of the rigid reducer is N, the theoretical output rotation angle of the rigid reducer is $\theta=\theta_m/N$ the output torque of the connecting rod is $\tau_l$, and the rotation angle of the connecting rod is q. $B_m$ is the inertia of the driving motor, and $B_l$ is the inertia of the connecting rod.

Figure 2:
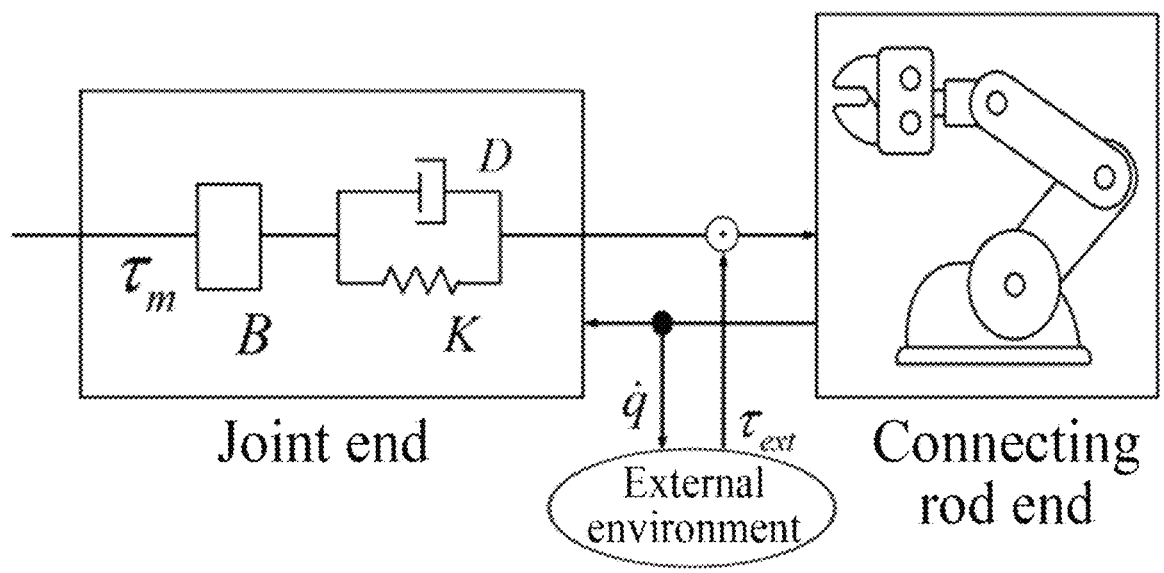
FIG. 2 is a schematic diagram of a mass-spring-damping system formed based on the abstraction of a robot flexible joint.
Figure 3:
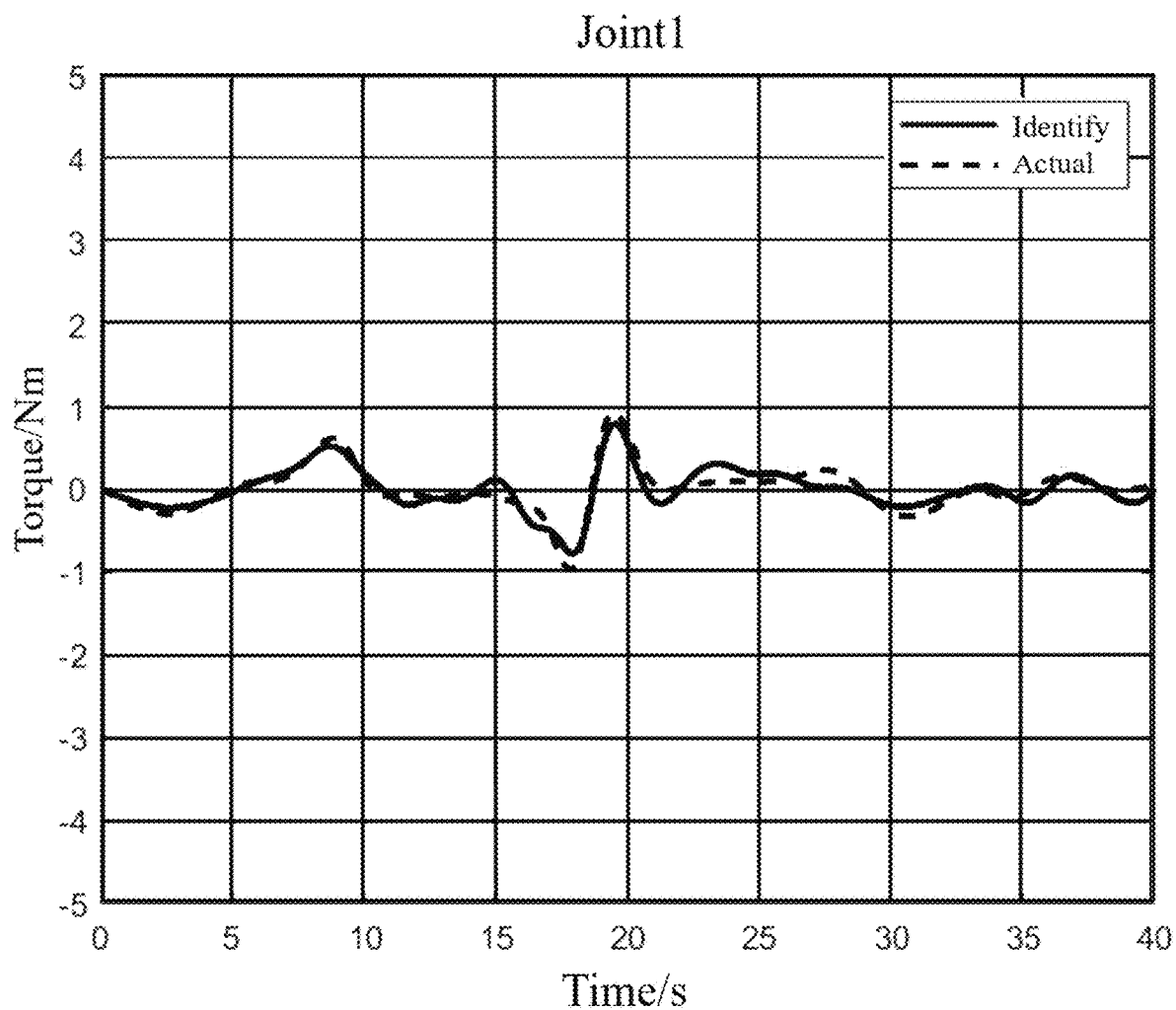
FIG. 3 is a diagram showing a comparison result between a joint identification torque and a measured torque of joint 1 in an embodiment.
Figure 4:
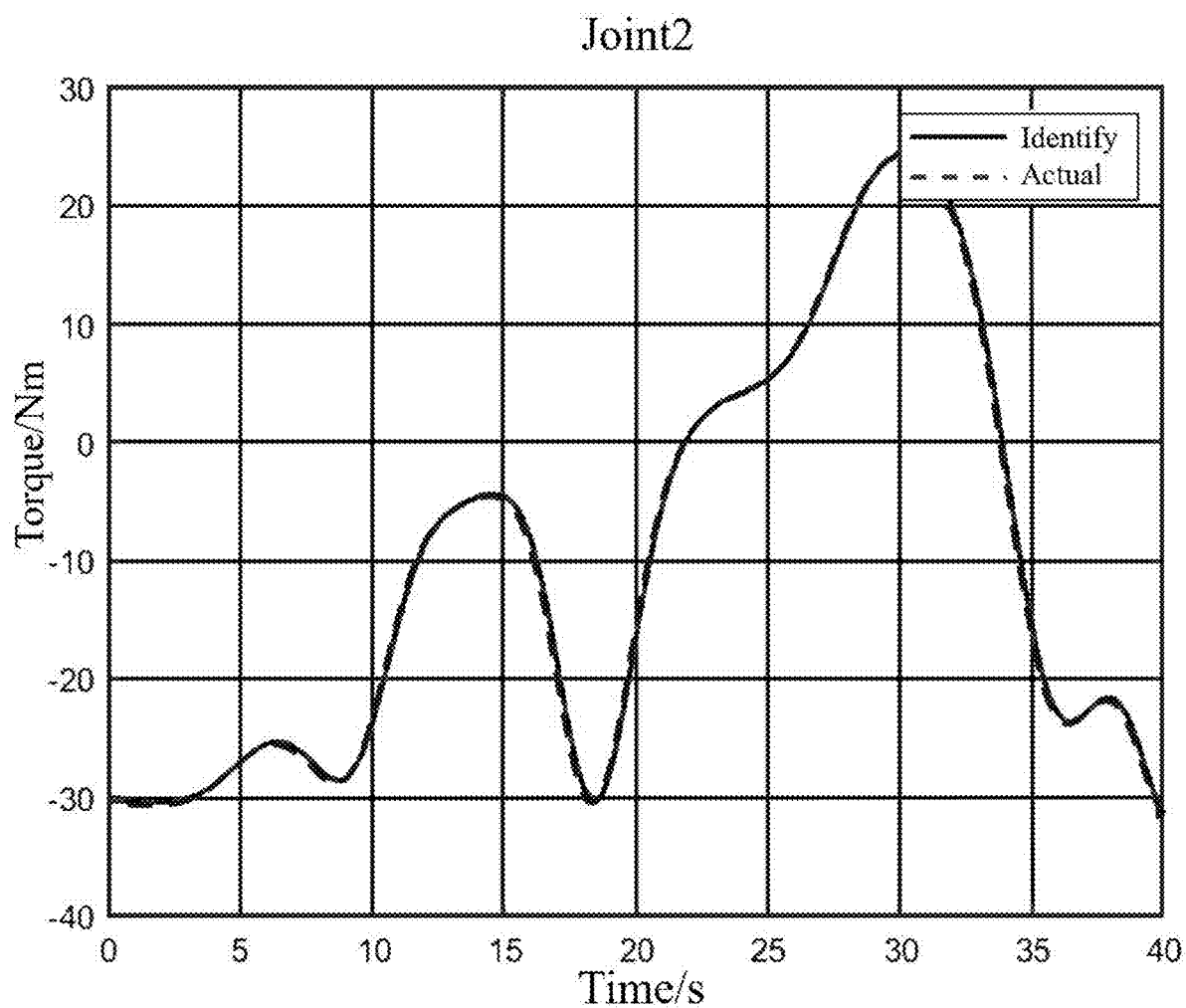
FIG. 4 is a diagram showing a comparison result between a joint identification torque and a measured torque of joint 2 in an embodiment.
Figure 5:
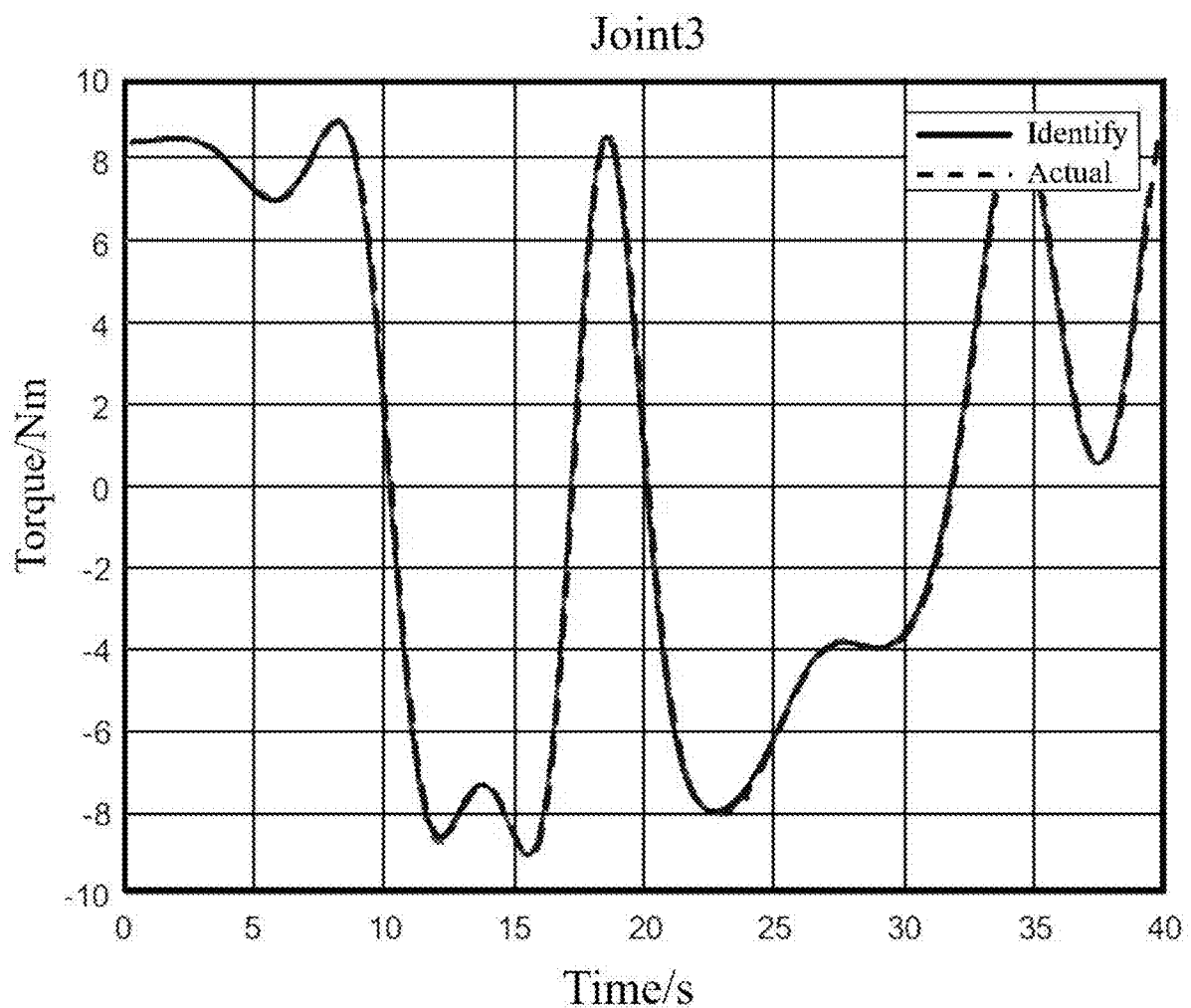
FIG. 5 is a diagram showing a comparison result between a joint identification torque and a measured torque of joint 3 in an embodiment.
Figure 6:
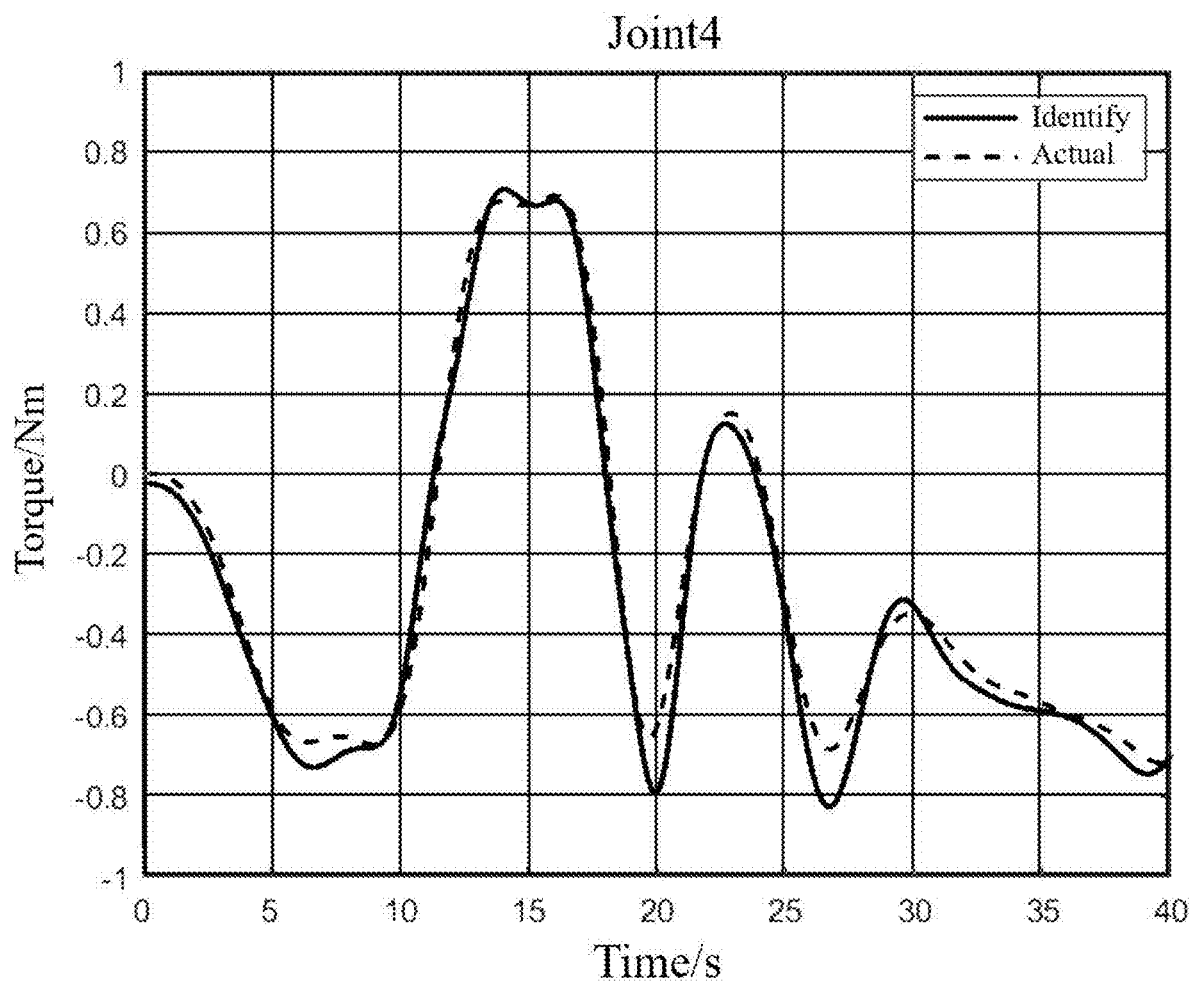
FIG. 6 is a diagram showing a comparison result between a joint identification torque and a measured torque of joint 4 in an embodiment.
Figure 7:
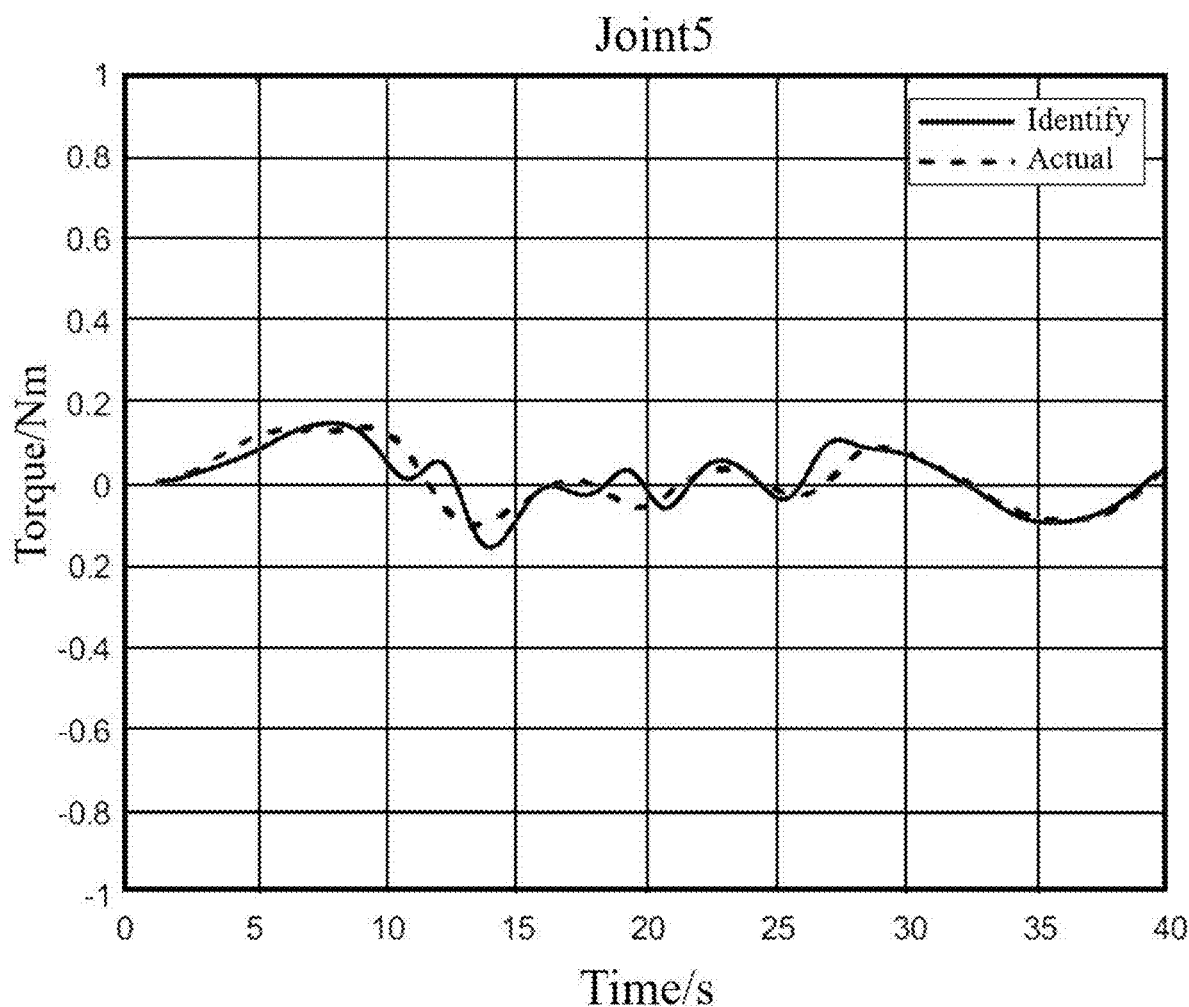
FIG. 7 is a diagram showing a comparison result between a joint identification torque and a measured torque of joint 5 in an embodiment.
Figure 8:
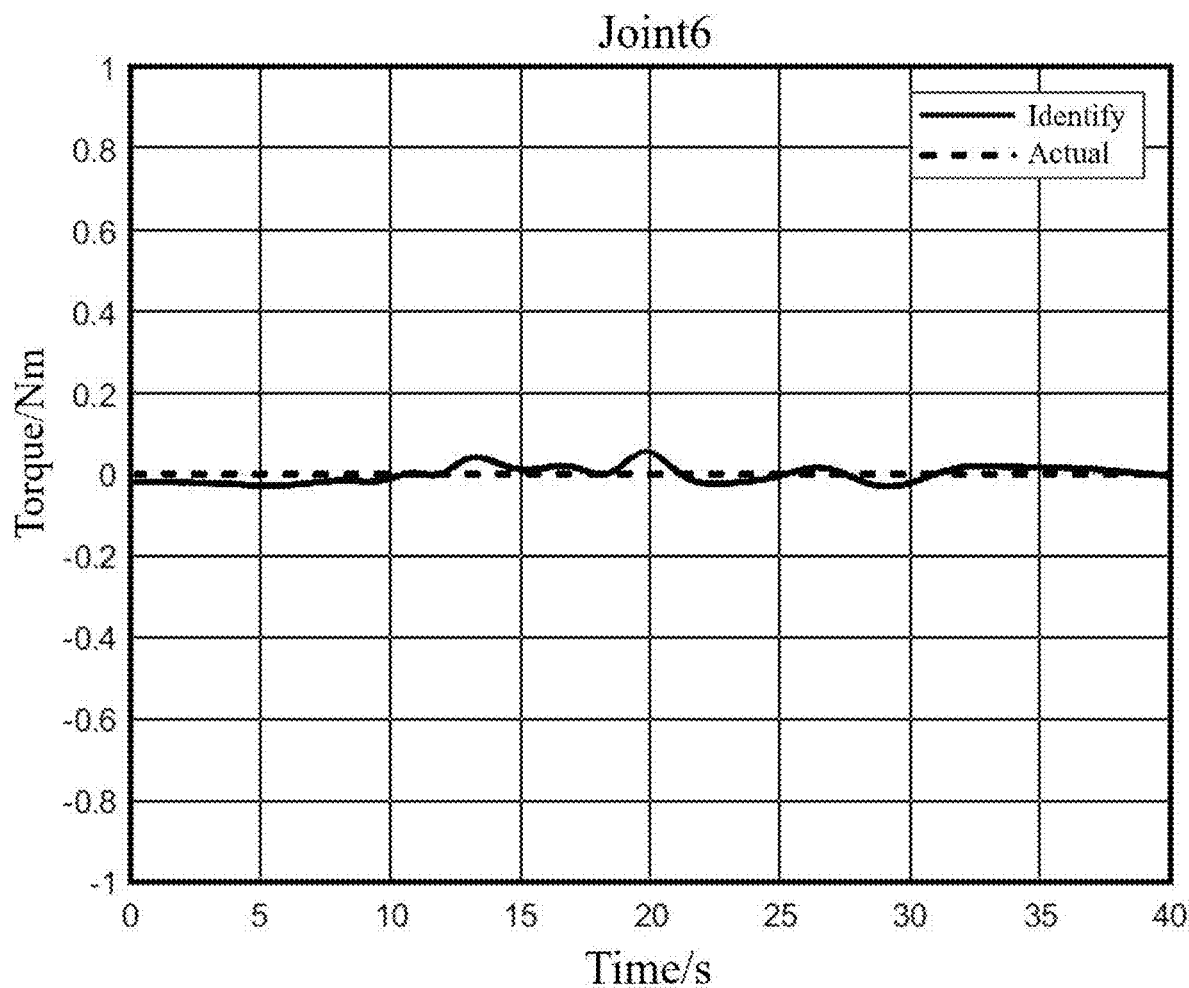
FIG. 8 is a diagram showing a comparison result between a joint identification torque and a measured torque of joint 6 in an embodiment.

The flexible joint of the robot can be further abstracted as a mass-spring-damping system, which consists of a torsion spring with equivalent stiffness K, equivalent damping D and mass B. The joint output torque is connected to the connecting rod end, as shown in FIG. 2.

Since the flexible link similar to mass-spring-damping is generated between the output end of the driving motor and the connecting rod, the complete robot dynamic model can no longer be expressed by one equation, and needs to be divided into two dynamic transfer equations: from the motor to the elastic torsion spring, and from the elastic torsion spring to the connecting rod. In this embodiment, the flexible joint dynamic model can be derived from Lagrange equation or Newton-Euler iterative equation in the following form:

$$B\ddot{\theta} + \tau + DK^{-1}\dot{\tau} = B\ddot{\theta} + K(\theta - q) + D(\dot{\theta} - \dot{q}) = \tau_m - \tau_f \quad (1)$$

$$M(q)\ddot{q} + C(q,\dot{q})\dot{q} + g(q) = \tau + DK^{-1}\dot{\tau} + \tau_{ext} = K(\theta - q) + D(\dot{\theta} - \dot{q}) + \tau_{ext} \quad (2)$$

$$\tau_f = [fv, fc]\begin{bmatrix} \dot{q} \\ \text{sgn}(\dot{q}) \end{bmatrix} \quad (3)$$

where $\tau$ denotes the actual joint torque in the robot joint; $M(q)$ denotes an inertia matrix of the connecting rod, $C(q,\dot{q})$ denotes a coupling matrix of a Coriolis force and a centrifugal force, $g(q)$ denotes a gravity matrix, $\tau_{ext}$ denotes external disturbance torque, $f_v$, $f_c$ denote a viscous friction coefficient and a Coulomb friction coefficient, respectively, and sgn( ) denotes an sgn function The flexible joint dynamic model consists of a dynamic relation expression from the driving motor to the elastic torsion spring, a dynamic relation expression from the elastic torsion spring to the connecting rod, and a friction force calculation model. Formula (1) represents the dynamic relation expression from the driving motor to the elastic torsion spring, in which it is defined that the output torque $\tau_m$ of the driving motor minus the friction torque $\tau_f$ between the motor and the reducer is equal to the moment of inertia at the joint end+the stiffness torque of the equivalent torsion spring+the damping torque of the equivalent torsion spring. Formula (2) represents the dynamic relation expression from the elastic element to the connecting rod, in which it is defined that the dynamic inertia term of the connecting rod+the coupling term of the Coriolis force and the centrifugal force+the gravity term is equal to the stiffness torque of the equivalent elastic torsion spring of the elastic element+the damping torque of the equivalent elastic torsion spring of the elastic element+the component of the external disturbance torque at the joint. Formula (3) is a friction force calculation model, in which it is defined that the friction torque $\tau_f$ between the motor and the reducer is equal to the Coulomb friction torque+the viscous friction torque. Formulas (1) to (3) form the robot dynamic equation considering the joint flexibility and friction.

Step 2: linear separation is carried out on the dynamic model.

The robot dynamic equation constructed in the above Step 1 is not linear, which brings difficulties to identification. Therefore, it is necessary to linearize the model and separate the model into two parts: the regression matrix Y including the state variables $q,\dot{q},\ddot{q},\theta,\dot{\theta},\ddot{\theta}$ multiplied by the identified parameters P, so as to facilitate identification processing. The general form of parameter linear separation considering joint flexibility and friction in the dynamic equation is shown as follows:

$$t = Y(q,\dot{q},\ddot{q},\theta,\dot{\theta},\ddot{\theta})P$$

$$P = [p_1, p_2, \ldots, p_6]^T;$$

where $p_i = [Ixx, Ixy, Ixz, Iyy, Iyz, Izz, mX, mY, mZ, m, f_v, f_c, K, D]^T$, in which $p_i$ represents a parameter group consisting of 14 identified parameters of the i-th flexible joint. Since the six-axis collaborative robot includes six flexible joints in total, i=1, 2, 3, 4, 5, 6. Among the 14 parameters of $p_i$, Ixx, Iyy, Izz denote the mass moments of inertia of the connecting rod around the x, y and z axes, Ixy, Ixz, Iyz denote the three inertia products of the connecting rod in the xy; xz and yz planes (used to describe the distribution of the rigid mass in the same coordinate system), mX, mY, mZ denote the three mass moments of the connecting rod in the x, y and z directions (i.e. the product of the centroid coordinate and the mass), m denotes the mass of the connecting rod, $f_v$, $f_c$ denote the viscous friction coefficient and the Coulomb friction coefficient, respectively, K and D denote the equivalent stiffness and the equivalent damping, respectively. It should be noted that the reference coordinate system of parameters Ixx, Ixy, Ixz, Iyy, Iyz, Izz is the relative connecting rod coordinate system, rather than the barycentric coordinate system.

Step 3: parameter independence processing is carried out.

The parameter vector separated in Step 2 is not full rank, and the identification algorithm involves the process of parameter inversion. Therefore, it is necessary to process the parameter vector to obtain the minimum parameter set. The minimum parameter set is the combination value of classical inertia parameters. The dynamic identification mainly identifies the combination value. The combination value can replace the actual parameters to simplify the dynamic model. The minimum parameter set is obtained so as to carry out parameter dimension reduction essentially, which can be directly derived from geometry or realized by a numerical method such as SVD and QR decomposition. Therefore, in this embodiment, based on the dynamic model equation obtained by the above linear separation, the dynamic equation for parameter identification is obtained finally through parameter independence processing:

$$\tau = Y_r(q,\dot{q},\ddot{q},\theta,\dot{\theta},\ddot{\theta})P_r$$

where $Y_r$ denotes a linear regression matrix, which is a matrix consisted of linearly independent columns in Y; $P_r$ denotes a minimum parameter set of the identified parameters P, that is, the column vector consisted of the minimum parameters. Each minimum parameter is a linear combination of the identified parameters P, and the linear combination of different minimum parameters is different. $\tau$ denotes the joint torque actually output by the flexible joint.

Step 4: a motion trajectory curve of a joint to be identified in the robot is designed in the form of Fourier series to optimize the trajectory. The motion trajectory curve is an angular trajectory, which consists of the time domain expression of the rotation angle q of the connecting rod, the time domain expression of the angular velocity $\dot{q}$ of the connecting rod and the time domain expression of the angular acceleration $\ddot{q}$ of the connecting rod and can be expressed by the following formula:

$$q_i(t) = \sum_{l=1}^{N_i} \left[ \frac{a_l^i}{\omega_f l} \sin(\omega_f l t) - \frac{b_l^i}{\omega_f l} \cos(\omega_f l t) + q_{i0} \right]$$

-continued $$\dot{q}_i(t) = \sum_{l=1}^{N_i} \left[ a_l^i \cos(\omega_f lt) + b_l^i \sin(\omega_f lt) \right]$$

$$\ddot{q}_i(t) = \sum_{l=1}^{N_i} \left[ -a_l^i \omega_f l \sin(\omega_f lt) + b_l^i \omega_f l \cos(\omega_f lt) \right]$$

where $N_i$ denotes the order of Fourier series, $q_i(t)$, $\dot{q}_i(t)$ and $\ddot{q}_i(t)$ denote the rotation angle q of the connecting rod, the angular velocity $\dot{q}$ of the connecting rod, and the angular acceleration $\ddot{q}$ of the connecting rod corresponding to the i-th flexible joint at time t, respectively; $\dot{q}_i(t)$ and $\ddot{q}_i(t)$ correspond to the first-order derivative expression and the second-order derivative expression of $q_i(t)$, respectively; $q_{i0}$ denotes a constant of a joint rotation angle, $a_l^i$ and $b_l^i$ denote constant coefficients of the motion trajectory, $\omega_f$ denotes a fundamental frequency of the motion trajectory, and $\psi_f l$ denotes the frequency of the l-th order.

Under the limited conditions such as a joint rotation angle and an angular velocity, the constant coefficients $a_l^i$, $b_l^i$ and $q_{i0}$ are optimized to minimize the condition number of the linear regression matrix $Y_r$, so as to reduce the numerical sensitivity of the minimum parameter set $P_r$. In this embodiment, for a six-axis collaborative robot with six flexible joints, generally, a fifth-order Fourier series can be selected to obtain a better identification effect. The natural frequency of the robot arm is avoided by setting the size of $\omega_f$ to avoid vibration and flexibility. In the process of running the robot according to the motion trajectory curve, the angle signals at the end of the connecting rod of the flexible joint can be acquired by the encoder. Discrete Fourier transform is performed on the signals. The frequency domain signals are filtered to take a main frequency, and then the inverse discrete Fourier transform is performed to obtain the time domain expression of the rotation angle. The time domain expression of the rotation angle is substituted into the first-order derivative expression and the second-order derivative expression in the trajectory. The angular velocity $\dot{q}_i(t)$ of the connecting rod and the angular acceleration $\ddot{q}_i(t)$ of the connecting rod can be calculated through an analytical method, which greatly reduces the noise compared with the traditional differential calculation method. Subsequently, the corresponding conversion and calculation methods will be introduced in detail in the data acquisition step.

Step 5: data is acquired.

Each flexible joint in the collaborative robot is controlled to move according to the designed motion trajectory curve. The data is acquired during the movement.

(1) Encoder position signals at a motor end and an output end of the harmonic reducer are acquired through double encoders during the movement. That is, the encoder position signals are acquired and filtered by the encoder at the motor end and the encoder at the output end of the reducer in the flexible joint are acquired and filtered, respectively. The encoder signals at the motor end are filtered to obtain the rotation angle $\theta_m$ of the motor, and the signals at the output end of the reducer are filtered to obtain the rotation angle q of the connecting rod of the encoder. Both the rotation angles are time domain signals.

(2) The rotation angle $\theta_m$ of the motor is divided by a reduction ratio N to obtain the theoretical output rotation angle $\theta$ of the rigid reducer, and the angular velocity $\dot{\theta}$ of the rigid reducer and the angular acceleration $\ddot{\theta}$ of the rigid reducer are further obtained through differential operation and filtering. At the same time, the angular velocity $\dot{q}$ and the angular acceleration $\ddot{q}$ of the connecting rod end (joint) are obtained analytically through the first-order and second-order differential expressions of the joint motion optimized trajectory. Specifically, the rotation angle q of the connecting rod is changed from a time domain signal to a frequency domain signal through the discrete Fourier transform, the frequency domain signal is filtered to take a main frequency, and then the inverse discrete Fourier transform is performed to obtain the time domain expression of the rotation angle q of the connecting rod, the time domain expression of the rotation angle of the connecting rod is substituted into the time domain expression of the angular velocity $\dot{q}$ of the connecting rod and the time domain expression of the angular acceleration $\ddot{q}$ of the connecting rod in the motion trajectory curve, and the angular velocity $\dot{q}$ of the connecting rod and the angular acceleration $\ddot{q}$ of the connecting rod are calculated through an analytical method.

(3) The joint torque $\tau$ is measured through a torque sensor, which is more accurate than the torque measured by the current loop.

(4) The joint flexible link stiffness K is obtained by the Formulas (1) or (2) in the flexible joint dynamic model through the identification of the least square method. In addition, the manufacturer of the harmonic reducer also provides the data table of equivalent spring torsional stiffness of the reducer under different loads, the joint flexible link stiffness K can be directly found by the looking up the table. The results thereof can be compared with the offline identification results.

(5) The joint flexible link damping D is calculated. After the friction parameters $f_v$, $f_c$ are obtained through identification, the friction torque $\tau_f$ can be obtained. With reference to the joint stiffness K obtained through identification and the known mass of the torsion spring B, the output torque $\tau_m$ of the motor, the output rotation angle $\theta$ of the rigid reducer and the rotation angle q of the connecting rod are acquired, and the damping coefficient D can be calculated and obtained by the Formula (1) in the flexible joint dynamic model.

Step 6: offline identification of minimum parameters is carried out.

A regression matrix Y is obtained by Newton-Euler recursive dynamic equation according to the six state variables $q, \dot{q}, \ddot{q}, \theta, \dot{\theta}, \ddot{\theta}$ obtained in Step 5, then linearly independent columns are obtained from the regression matrix Y through matrix decomposition (SVD or QR decomposition), the linear regression matrix $Y_r$ is formed, the linear regression matrix $Y_r$ and the joint torque $\tau$ actually output by the flexible joint measured in Step 5 are substituted into the dynamic equation after the parameter independence processing in Step 3, and calculation is carried out by a least square method to obtain the minimum parameter set corresponding to the identified parameters to complete offline identification.

In this embodiment, the least square method is used as the identification algorithm, which has the advantages that the structure is simple, no extra experience is required in parameter setting, the dynamic equation does not need to be converted into the state equation, and the accuracy is ideal. The general form of calculating the minimum parameter set offline by the least square method is:

$$P = (Y_r^T Y_r)^{-1} Y_r^T \tau$$

Step 7: the minimum parameters are updated online.

The offline identification result in Step 6, that is, the minimum parameter set $P_r$ corresponding to the identified parameters obtained by calculation, is taken as the initial dynamic parameter estimation value updated online. The minimum parameter set $P_r$ is substituted into the dynamic equation in the robot controller. The robot controller controls the robot in the actual operation process based on the dynamic equation, and continues to acquire the rotation angle $\theta_m$ of the motor, the rotation angle q of the connecting rod and the joint torque τ actually output by the flexible joint online in each time step through the double encoders and the torque sensor built in the flexible joint in the actual operation process. The six state variables and the linear regression matrix $Y_r$ are calculated in each time step according to the same method as offline identification (refer to Step 4 to Step 6 above). Unlike offline identification, it is necessary to replace the ordinary least square method with a recursive least square algorithm with a forgetting factor. In each time step, according to the calculated linear regression matrix $Y_r$ and the joint torque τ, the minimum parameter set of the dynamic equation in the robot controller is updated in a recursive manner by running a recursive least square algorithm with a forgetting factor for controlling the robot in the next time step. The online updating process is carried out in each time step in a recursive manner, and the parameter estimation can be updated by recursive updating rules:

$$\begin{cases} \hat{P}r(k+1) = \hat{P}r(k) + K(k+1)(y(k+1) - \psi^T(k+1)\hat{P}r(k)) \\ K(k+1) = P(k)\psi(k+1)/(\lambda I + \psi^T(k+1)P(k)\psi(k+1)) \\ P(k+1) = (\lambda I - K(k+1)\psi^T(k+1))P(k)/\lambda \\ e(k+1) = y(k+1) - \psi^T(k+1)\hat{P}r(k) \end{cases}$$

where $\hat{P}_r(k+1)$ denotes the parameter identification value of the (k+1)-th time step; ψ(k+1) denotes the design matrix of input data, which describes the relationship between input data and parameters; K(k+1) denotes the gain matrix for adjusting the error between the measured data and the identification data; P(k+1) denotes an error covariance matrix, which describes the uncertainty of parameter estimation; y(k+1) denotes an output value at the current moment; e(k+1) denotes an error value of parameter estimation at the current moment, which is the difference between the output value at the current moment and the predicted output value; λ denotes the forgetting factor, which controls the accuracy of parameter estimation and response speed, and takes the value according to the actual situation of the system with the range of [0.95,1]; and I is an identity matrix.

Therefore, it can be ensured that the dynamic parameters of the robot can be updated continuously according to the actual operation situation, and the high control accuracy can be maintained for a long time.

Step 8: the parametric dynamic model is changed into a state space form.

This embodiment can also convert the identified dynamic parameter combination value into a state space form, and explicitly give the inertia term, the coupling term of a Coriolis force and a centrifugal force, a gravity term, a friction term, a stiffness damping term, etc., so as to apply various control methods to realize accurate force control in the robot servo driver subsequently.

Finally, in this embodiment, the robot dynamic model considering the flexibility of the joint reducer is subjected to linear processing and QR decomposition to obtain the minimum parameter set, so that the robot can run the excitation trajectory and acquire the double-angle data and the torque data of the joint. The least square method is used to identify the parameters of the connecting rod and the reducer offline, and then the recursive least square method is used to carry out online self-adaptive updating. FIG. 3, FIG. 4, FIG. 5, FIG. 6, FIG. 7 and FIG. 8 illustrate the dynamic parameters obtained through identification in the present disclosure, the comparison between the torque values of six joints of the robot under arbitrary trajectory movement and the actual torque values measured by the sensor is calculated, respectively. The results show that the joint torque identification values of six flexible joints can basically approach the measured values, indicating that the dynamic model constructed by the present disclosure is reasonable and the identification effect of the dynamic parameter is good.

The embodiments described above are only better schemes of the present disclosure, which are not intended to limit the present disclosure. Those skilled in the relevant technical field can make various changes and modifications without departing from the spirit and scope of the present disclosure. Therefore, all the technical schemes obtained by equivalent substitution or equivalent transformation fall within the scope of protection of the present disclosure.

What is claimed is:

1. A self-adaptive identification method for nonlinear dynamic parameters of a reducer, which is used for parameter identification of each flexible joint in a collaborative robot, wherein the method comprises:
   S1: modeling each flexible joint in the collaborative robot, modeling a harmonic reducer corresponding to a flexible joint as a concatemer of a rigid reducer and an elastic torsion spring, connecting the rigid reducer with a driving motor corresponding to the flexible joint directly, and connecting the elastic torsion spring with a connecting rod corresponding to the flexible joint directly; and carrying out linear separation and parameter independence processing on a flexible joint dynamic model obtained by modeling to finally obtain a dynamic equation for parameter identification, wherein in the dynamic equation, a linear regression matrix is multiplied by a minimum parameter set of identified parameters to obtain a joint torque actually output by the flexible joint;
   the flexible joint dynamic model consists of a dynamic relation expression from the driving motor to the elastic torsion spring, a dynamic relation expression from the elastic torsion spring to the connecting rod and a friction force calculation model, and specific forms of three calculation formulas are as follows:

$$B\ddot{\theta} + \tau + DK^{-1}\dot{\tau} = B\ddot{\theta} + K(\theta - q) + D(\dot{\theta} - \dot{q}) = \tau_m - \tau_f \quad (1)$$

$$M(q)\ddot{q} + C(q,\dot{q})\dot{q} + g(q) = \tau + DK^{-1}\dot{\tau} + \tau_{ext} = K(\theta - q) + D(\dot{\theta} - \dot{q}) + \tau_{ext} \quad (2)$$

$$\tau_f = [fv, fc]\begin{bmatrix} \dot{q} \\ \mathrm{sgn}(\dot{q}) \end{bmatrix} \quad (3)$$

where K denotes equivalent stiffness, D denotes equivalent damping, B denotes mass of the torsion spring, θ denotes a theoretical output rotation angle of the rigid reducer, $\dot{\theta}$ denotes an angular velocity of the rigid reducer, $\ddot{\theta}$ denotes an angular acceleration of the rigid reducer, q denotes a rotation angle of the connecting rod, $\dot{q}$ denotes an angular velocity of the connecting rod, $\ddot{q}$ denotes an angular acceleration of the connecting rod, τ denotes an actual joint torque output by the flexible joint, $\dot{\tau}$ denotes a first-order derivative of τ, $\tau_m$ denotes torque of the flexible joint input by the driving motor, M(q) denotes an inertia matrix of the connecting rod, C(q, q̇) denotes a coupling matrix of a Coriolis force and a centrifugal force, g(q) denotes a gravity matrix, $\tau_{ext}$ denotes external disturbance torque, fv, fc denote a viscous friction coefficient and a Coulomb friction coefficient, respectively, sgn( ) denotes an sgn function; and $\tau_r$ denotes a friction torque of the reducer;

in the dynamic equation, the identified parameters comprise a parameter group corresponding to each flexible joint in the collaborative robot, and the parameter group corresponding to each flexible joint comprises 14 parameters, that is, three mass moments of inertia of the connecting rod around x, y and z axes, three inertia products of the connecting rod in xy, xz and yz planes, three mass moments of the connecting rod in x, y and z directions, mass of the connecting rod, the viscous friction coefficient, the Coulomb friction coefficient, the equivalent stiffness, and the equivalent damping;

S2: designing a motion trajectory curve of each flexible joint to be identified in the collaborative robot in a form of Fourier series; wherein the motion trajectory curve consists of a time domain expression of the rotation angle of the connecting rod, a time domain expression of the angular velocity of the connecting rod and a time domain expression of the angular acceleration of the connecting rod;

S3: controlling each flexible joint in the collaborative robot to move according to the designed motion trajectory curve, acquiring encoder position signals at a motor end and an output end of the harmonic reducer through double encoders during a movement, filtering the encoder position signals to obtain time domain signals of a rotation angle of the motor and the rotation angle of the connecting rod, and measuring the joint torque actually output by the flexible joint through a torque sensor built in the flexible joint; dividing the rotation angle of the motor by a reduction ratio of the reducer to obtain the theoretical output rotation angle of the rigid reducer, and further obtaining the angular velocity of the rigid reducer and the angular acceleration of the rigid reducer through differential operation and filtering; changing the rotation angle of the connecting rod from a time domain signal to a frequency domain signal through discrete Fourier transform, filtering the frequency domain signal to take a main frequency and then performing inverse discrete Fourier transform to obtain the time domain expression of the rotation angle of the connecting rod, substituting the time domain expression of the rotation angle of the connecting rod into the time domain expression of the angular velocity of the connecting rod and the time domain expression of the angular acceleration of the connecting rod in the motion trajectory curve, and calculating the angular velocity of the connecting rod and the angular acceleration of the connecting rod through an analytical method;

S4: taking the theoretical output rotation angle of the rigid reducer, the angular velocity of the rigid reducer, the angular acceleration of the rigid reducer, the rotation angle of the connecting rod, the angular velocity of the connecting rod, and the angular acceleration of the connecting rod as six state variables, obtaining a regression matrix by Newton-Euler recursive dynamic equation, then obtaining linearly independent columns from the regression matrix through matrix decomposition and forming the linear regression matrix, substituting the linear regression matrix and the joint torque actually output by the flexible joint into the dynamic equation, and carrying out calculation by a least square method to obtain the minimum parameter set corresponding to the identified parameters to complete offline identification;

calculating remaining 13 parameters except the equivalent damping among the identified parameters by the least square method, and calculating and obtaining the equivalent damping by substituting parameters obtained by the least square method and known parameters in data acquisition process into the flexible joint dynamic model;

substituting the minimum parameter set obtained by offline identification in S4 into the dynamic equation as an initial value, controlling the robot by a robot controller in an actual operation process based on the dynamic equation, continuing to acquire the rotation angle of the motor, the rotation angle of the connecting rod and the joint torque actually output by the flexible joint online in each time step through the double encoders and the torque sensor built in the flexible joint in the actual operation process, calculating the six state variables and the linear regression matrix in each time step according to a same method as the offline identification, and updating the minimum parameter set of the dynamic equation in a next time step of the robot controller online by running a recursive least square algorithm with a forgetting factor.

2. The self-adaptive identification method for nonlinear dynamic parameters of the reducer according to claim 1, wherein in the motion trajectory curve, the time domain expression of the rotation angle of the connecting rod, the time domain expression of the angular velocity of the connecting rod, and the time domain expression of the angular acceleration of the connecting rod corresponding to any i-th flexible joint are respectively:

$$q_i(t) = \sum_{l=1}^{N_i} \left[ \frac{a_l^i}{\omega_f l} \sin(\omega_f l t) - \frac{b_l^i}{\omega_f l} \cos(\omega_f l t) + q_{i0} \right]$$

$$\dot{q}_i(t) = \sum_{l=1}^{N_i} \left[ a_l^i \cos(\omega_f l t) + b_l^i \sin(\omega_f l t) \right];$$

$$\ddot{q}_i(t) = \sum_{l=1}^{N_i} \left[ -a_l^i \omega_f l \sin(\omega_f l t) + b_l^i \omega_f l \cos(\omega_f l t) \right]$$

where $N_i$ denotes an order of Fourier series, $q_i(t)$, $\dot{q}_i(t)$ and $\ddot{q}_i(t)$ denote the rotation angle q of the connecting rod, the angular velocity $\dot{q}$ of the connecting rod, and the angular acceleration $\ddot{q}$ of the connecting rod corresponding to the i-th flexible joint at time t, respectively; $q_{i0}$ denotes a constant of a joint rotation angle, $a_l^i$ and $b_l^i$ denote constant coefficients of a motion trajectory, $\omega_f$ denotes a fundamental frequency of the motion trajectory, and $\psi_f l$ denotes a frequency of an l-th order.

3. The self-adaptive identification method for nonlinear dynamic parameters of the reducer according to claim 2, wherein the order $N_i$ of Fourier series in the motion trajectory curve is 5.

4. The self-adaptive identification method for nonlinear dynamic parameters of the reducer according to claim 1, wherein the matrix decomposition uses singular value decomposition or orthogonal triangular decomposition.

5. The self-adaptive identification method for nonlinear dynamic parameters of the reducer according to claim 1, wherein the collaborative robot is a six-axis collaborative robot, and comprises six flexible joints in total.

* * * * *